UNITED STATES PATENT OFFICE.

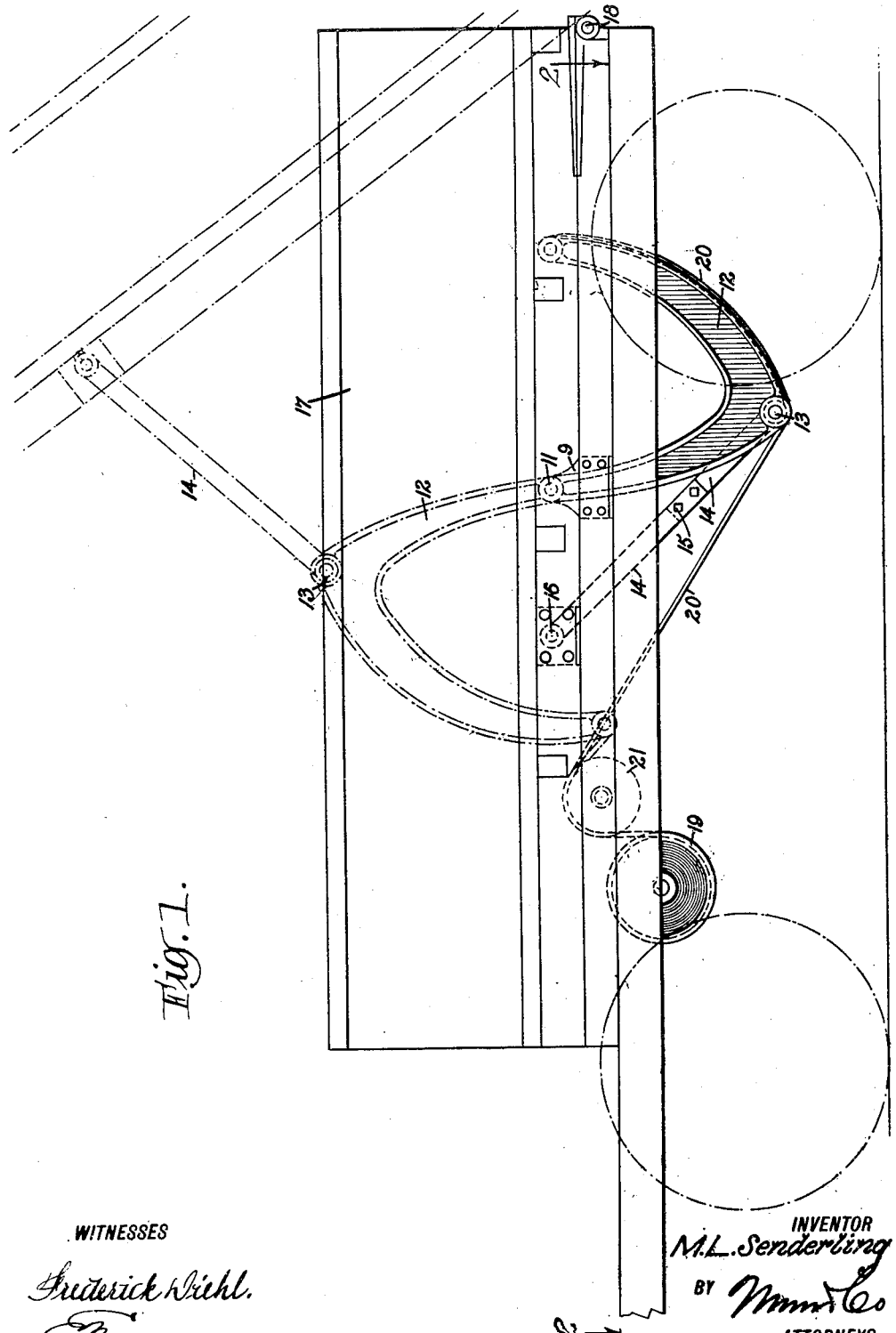

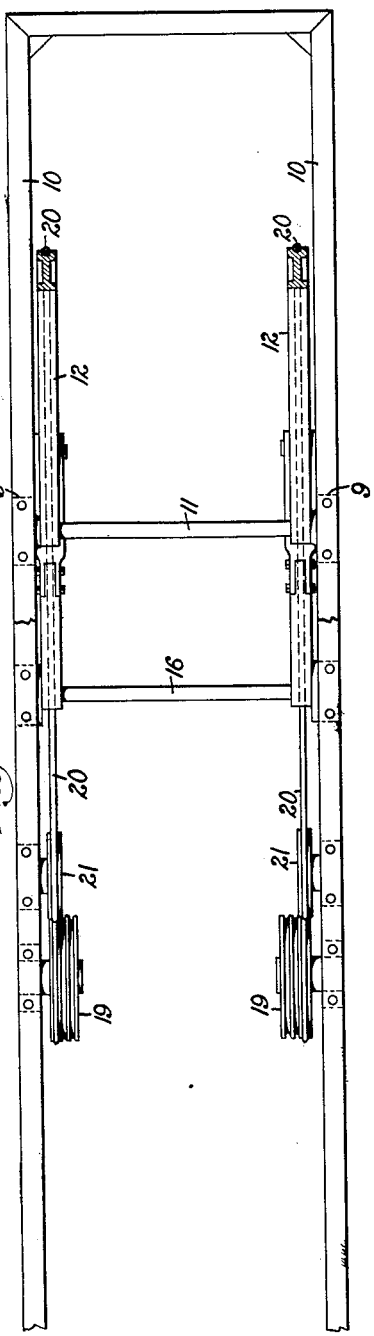

MARTIN L. SENDERLING, OF JERSEY CITY, NEW JERSEY.

HOISTING MECHANISM.

1,355,576.   Specification of Letters Patent.   Patented Oct. 12, 1920.

Application filed May 16, 1917. Serial No. 168,914.

*To all whom it may concern:*

Be it known that I, MARTIN L. SENDERLING, a citizen of the United States, and a resident of Jersey City, in the county of Hudson and State of New Jersey, have invented a new and Improved Hoisting Mechanism, of which the following is a full, clear, and exact description.

Among the principal objects which the present invention has in view are:

To secure a rotative center in close proximity to the part to be lifted;

To increase efficiency in the power applied.

To simplify the mechanism.

To reduce the height of vehicle to facilitate the loading thereof.

To regulate the power applied in correspondence with the work performed.

*Drawings.*

Figure 1 is a side elevation of a hoisting mechanism constructed and arranged in accordance with the present invention, the active position of the body of a wagon and said hoisting mechanism being shown in broken lines;

Fig. 2 is a top plan view of a vehicle chassis and a hoisting mechanism constructed and arranged in accordance with the present invention mounted thereon, the body to be hoisted being removed.

*Description.*

As seen in the drawings, the hoisting mechanism is applied to an automobile chassis of conventional construction.

To install the hoisting mechanism, brackets 9 are mounted on the side bars 10 to provide bearings for a pivot rod 11. The rod 11 has attached thereto and adjacent the opposite ends thereof, quadrants 12. At suitable points on said quadrants, pivot pins 13 are mounted to engage the lower members of extension bars 14. The two members of each of the bars 14 are connected by bolts 15 and are provided with a series of registering bolt-holes through which said bolts pass, and by the various arrangements thereof the extension bars 14 may be elongated or shortened. The opposite ends of the bars are pivotally connected by means of a rod 16 with the body 17 of the vehicle. As shown best in Fig. 1 of the drawings, the body 17 has a rearwardly-disposed hinge 18 whereby when the hoisting mechanism is operated to that end, the body is hoisted as shown by broken lines in said Fig. 1.

The cardinal feature of this hoisting mechanism is its adaptability to maintain its center of rotation in close proximity with the part to be lifted away from it, thereby giving a longer radius of movement to the hoisting body and parts connected therewith.

To move the quadrants and extension bars 14 connected therewith from the inactive position which is shown in full lines in Fig. 1 of the drawings, to the active position which is shown by broken lines in said figure, two power-driven drums 19 are employed. The drums 19 are suitably supported on a frame-work and are connected with any available source of power. The drums 19 are arranged to wind the cables 20. The opposite ends of the cables 20 are anchored at the far ends of the quadrants 12. The quadrants are provided at the far side thereof with grooves in which the said cables rest when the quadrants are in the inactive position above referred to. Guide sheaves 21 are provided to guide the cables 20 and to facilitate the mounting of the drums 19.

It is to be understood that modifications of the applications of power are permissible that do not affect the operation of the hoisting mechanism itself as forming part and parcel of this invention.

The illustrations represent the hoisting mechanism as operative frontwise; it is to be understood that it may also operate reversely, or rearwardly, and also sidewise, by a suitable adaptation of parts to operating power and to meet changes in the direction of discharge of loads.

*Operation.*

When provided with a hoisting mechanism constructed and arranged in accordance with the present invention, a vehicle of the type illustrated in the accompanying drawings normally rests as shown in Fig. 1 thereof by full lines, with the quadrant 12 in the depressed and rearwardly-disposed position.

The vehicle having arrived at its destination where it is desired to hoist the body 17 to the position shown by broken lines in Fig. 1 of the drawings, power is applied to rotate the drums 19 for winding the cables 20 thereon. The cables 20 rotate said quadrants to advance the bars 14 connected therewith to lift the body 17. The body 17 rotates on the hinge 18. The rod 16 being carried thereby, the attached ends of the bars 14 are moved therewith, the arc of the movement of the said rod and attached bars being concentric with the hinge 18, while the opposite ends of the said bars being attached to the quadrants 12 and the pins 13 move on the arc having for its center the axis of the rod 11.

Claims.

1. A hoisting mechanism comprising two pivotally connected structures, one of said structures being relatively stationary in a horizontal plane, and the other relatively movable to an inclined plane, a power mechanism mounted on the stationary structure at a point remote from the pivotal connection of said structures, a lever pivoted to the stationary structure and operated by the power mechanism to swing it on its pivot, a link having one end pivoted to the lever and having its other end pivoted to the movable structure, the pivot connecting the link with the movable structure being disposed between the pivot of the lever and the power mechanism when the movable structure is in a horizontal position, and means for maintaining an even stress on the said lever throughout the movement thereof, said means consisting of a curved member extending from the lever at the point of pivotal connection of the link with the lever.

2. A hoisting mechanism comprising two pivotally connected structures, one of said structures being relatively stationary in a horizontal plane and the other relatively movable to an inclined plane; a power mechanism permanently mounted on one of said structures at a point removed from the pivotal connection of said structures; a lever pivotally mounted on said stationary structure and operatively connected with said power mechanism to be swung thereby on its pivot; a link member pivotally connecting said lever and said movable structure, said link being disposed between the pivot of said lever and said power mechanism when the movable structure is substantialy horizontal; and means for maintaining an even stress on said lever throughout the movement thereof, said means embodying a quadrant extending from the pivotal connection of said link and said lever to the free end of said lever.

3. A hoisting mechanism comprising two pivotally connected structures, one of said structures being relatively stationary in a horizontal plane and the other relatively movable to an inclined plane; a power mechanism permanently mounted on one of said structures at a point removed from the pivotal connection of said structures; a lever pivotally mounted on said stationary structure and operatively connected with said power mechanism to be swung thereby on its pivot; a link member pivotally connecting said lever and said movable structure, said link being disposed between the pivot of said lever and said power mechanism when the movable structure is substantially horizontal; and means for maintaining an even stress on said lever throughout the movement thereof, said means embodying a quadrant integrally formed with said lever and extending from the pivotal connection of said lever and said link to a point intermediate the fulcrum of said lever and the pivotal connection of said structures, and a cable operatively connecting said quadrant and said power mechanism, said cable being attached to the far end of said quadrant.

MARTIN L. SENDERLING.